(12) United States Patent
Hahm et al.

(10) Patent No.: US 8,861,548 B2
(45) Date of Patent: Oct. 14, 2014

(54) METHOD AND APPARATUS FOR TRANSMITTING DATA IN CABLE NETWORK

(75) Inventors: Young Kwon Hahm, Daejeon-si (KR); Dong Joon Choi, Daejeon-si (KR); Nam Ho Hur, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 242 days.

(21) Appl. No.: 13/359,055

(22) Filed: Jan. 26, 2012

(65) Prior Publication Data

US 2012/0195257 A1    Aug. 2, 2012

(30) Foreign Application Priority Data

Jan. 27, 2011    (KR) ........................ 10-2011-0008344
Jan. 19, 2012    (KR) ........................ 10-2012-0005975

(51) Int. Cl.
| | |
|---|---|
| *H04J 3/16* | (2006.01) |
| *H04H 20/42* | (2008.01) |
| *H04L 12/28* | (2006.01) |
| *H04H 60/15* | (2008.01) |
| *H04L 1/00* | (2006.01) |
| *H04L 12/46* | (2006.01) |
| *H04L 29/06* | (2006.01) |
| *H04L 29/08* | (2006.01) |

(52) U.S. Cl.
CPC ................ *H04H 20/42* (2013.01); *H04L 69/32* (2013.01); *H04H 2201/70* (2013.01); *H04L 12/2801* (2013.01); *H04L 69/323* (2013.01); *H04H 60/15* (2013.01); *H04L 1/0084* (2013.01); *H04L 1/0041* (2013.01); *H04L 12/4633* (2013.01); *H04L 69/22* (2013.01)
USPC ........................................................ 370/469

(58) Field of Classification Search
None
See application file for complete search history.

(56) References Cited

U.S. PATENT DOCUMENTS

| 5,745,837 A * | 4/1998 | Fuhrmann ..................... 725/114 |
| 2007/0230406 A1 | 10/2007 | Kim et al. |
| 2013/0070784 A1 * | 3/2013 | Denney et al. ................ 370/462 |

FOREIGN PATENT DOCUMENTS

KR     1020030080307 A    10/2003

* cited by examiner

*Primary Examiner* — Rhonda Murphy
(74) *Attorney, Agent, or Firm* — William Park & Associates Patent Ltd.

(57) ABSTRACT

Disclosed herein are a method and an apparatus for transmitting data in a cable network. The transmitter generates upper layer data including multiplexed data of a plurality of subscriber terminals, dividing the upper layer data into a plurality of segment data, performs channel coding on each segment data, extracts information on at least one subscriber terminal included in each segment data to generate subscriber identification signals, inserts the subscriber identification signals into each channel-coded segment data, and modulates and transmits each segment data into which the subscriber identification signals are inserted.

19 Claims, 5 Drawing Sheets

METHOD AND APPARATUS FOR TRANSMITTING DATA IN CABLE NETWORK

CROSS-REFERENCE TO RELATED APPLICATIONS

This application claims the benefit of priority of Korean Patent application No. 10-2011-0008344 filed on Jan. 27, 2011, and Korean Patent application No. 10-2012-0005975 filed on Jan. 19, 2012, all of which are incorporated by reference in their entirety herein.

BACKGROUND OF THE INVENTION

1. Field of the Invention

The present invention relates to a cable network, and more particularly, to a method and an apparatus for transmitting data in a cable network.

2. Related Art

Recently, as a demand for multimedia contents such a high definition (HD) broadcast, or the like, and large-capacity data is suddenly increased, a case in which a mobile terminal processes the multimedia contents and the large-capacity data has also been increased. As a size of data is increased, the amount of consumed power has no choice but to be increased when processing the data. Therefore, the power consumption and complexity due to the data processing in the terminal have been on the rise as an important issue.

Meanwhile, when a subscriber terminal processes data having a large size, data associated with the subscriber terminal may be a portion of received data. Generally, in a bidirectional multimedia transmission system using a cable network, the subscriber terminal may receive data in which received data of several users are multiplexed within a received frequency band and extract data corresponding to the subscriber terminal among the received data. In this case, the subscriber terminal may extract the data corresponding to the subscriber terminal after the received data are subjected to all the processes such as demodulation, decoding, or the like, in a physical layer. That is, the subscriber terminal also processes data having no connection with the subscriber terminal in the physical layer and therefore, the power consumption of the subscriber terminal is increased.

Meanwhile, there has been provided a method for reducing power consumption of a subscriber terminal by providing signaling for identifying data corresponding to each service in a physical layer. However, even though data corresponding to each service are identified, data of several users can be multiplexed within each service like internet services. Therefore, there is a limitation in reducing the power consumption of the subscriber terminal. In addition, a method for identifying data of each subscriber terminal in the physical layer has not been proposed up to now.

Therefore, in order to reduce the power consumption of the subscriber terminal, a need exists for a method for identifying data of each subscriber terminal before a physical layer.

SUMMARY OF THE INVENTION

The present invention provides a method and an apparatus for transmitting data in a cable network. The present invention also provides a method for identifying data of each subscriber terminal before a physical layer. The present invention also provides a method for identifying data of each subscriber terminal within each segment data by generating subscriber identification signals.

In an aspect, a transmitter in a cable network is provided. The transmitter includes a media access control (MAC) and upper layer data generation unit configured to generate upper layer data including multiplexed data of a plurality of subscriber terminals, a segmentation unit, coupled to the MAC and upper layer data generation unit, and configured to divide the upper layer data into a plurality of segment data, a channel coding unit, coupled to the segmentation unit, and configured to perform channel coding on each segment data, a subscriber information extraction and subscriber identification signal generation unit, coupled to the segmentation unit, and configured to extract information on at least one subscriber terminal included in each segment data to generate subscriber identification signals, a subscriber identification signal insertion unit, coupled to the channel coding unit and the subscriber information extraction and subscriber identification signal generation unit, and configured to insert the subscriber identification signals into each channel-coded segment data, and a modulation and radio frequency (RF) unit, coupled to the subscriber identification signal insertion unit, and configured to modulate and transmit each segment data into which the subscriber identification signals are inserted.

The channel coding unit may be further configured to perform interleaving on each segment data.

The subscriber information extraction and subscriber identification signal generation unit may be further configured to acquire information identifying subscriber terminal based on information on an uplink channel obtained from the subscriber terminal.

The information identifying the subscriber terminal may be an MAC address or an IP address of the subscriber terminal.

The subscriber identification signal may include a header, an identification bit of each subscriber terminal and a cyclic redundancy check (CRC).

The identification bit of each subscriber terminal may be 1 bit.

The identification bit of each subscriber terminal may be set to be 1 when the data of the corresponding subscriber terminal are included in each segment data, and the identification bits of each subscriber terminal may be set to be 0 when the data of the corresponding subscriber terminal are not included in each segment.

A total number of bits of the identification bit of each subscriber terminal may be the same as the number of subscriber terminals within a cell.

The header may include a synchronization code.

The header may be subjected to quadrature phase shift keying (QPSK) modulation.

The segmentation unit, the channel coding unit, the subscriber identification signal insertion unit, and the modulation and RF unit may be operated in a physical layer.

In another aspect, a method for transmitting data in a cable network is provided. The method includes generating upper layer data including multiplexed data of a plurality of subscriber terminals, dividing the upper layer data into a plurality of segment data, performing channel coding on each segment data, extracting information on at least one subscriber terminal included in each segment data to generate subscriber identification signals, inserting the subscriber identification signals in each channel-coded segment data, and modulating and transmitting each segment data into which the subscriber identification signals are inserted.

In another aspect, a subscriber terminal in a cable network is provided. The subscriber terminal includes a radio frequency (RF) receiving unit configured to receive a plurality of segment data including subscriber identification signals, a synchronization and demodulation unit, coupled to the RF receiving unit, and configured to acquire system synchronization and demodulate the plurality of segment data, a segment identification unit, coupled to the synchronization and demodulation unit, and configured to extract segment data in which data of the subscriber terminal are present among the plurality of segment data based on the demodulated subscriber identification signals and a subscriber identification code, a channel decoding unit, coupled to the segment identification unit, and configured to perform channel decoding on the segment data in which the data of the subscriber terminal are present, and a subscriber packet identification unit, coupled to the channel decoding unit, and configured to extract the data of the subscriber terminal in the segment data in which the data of the subscriber terminal are present.

The subscriber identification code may be acquired during a system initialization process.

The subscriber identification code may indicate a position to which an identification bit of each subscriber terminal are assigned within the subscriber identification signals.

The segment identification unit may be further configured to inspect a cyclic redundancy check of the demodulated subscriber identification signals.

The segment identification unit may be further configured to transport all the plurality of segment data to the channel decoding unit when errors occur as a result of the CRC inspection.

The segment identification unit may be further configured to transport the segment data in which the data of the subscriber terminal are present to the channel decoding unit when errors do not occur as a result of the CRC inspection.

The channel decoding unit may be further configured to perform de-interleaving on the segment data in which the data of the subscriber terminal are present.

DESCRIPTION OF EXEMPLARY EMBODIMENTS

Hereinafter, embodiments of the present invention will be described in detail with reference to the accompanying drawings so that those skilled in the art may easily practice the present invention. However, the present invention may be modified in various different ways and is not limited to the exemplary embodiments provided in the present description. In the accompanying drawings, portions unrelated to the description will be omitted in order to obviously describe the present invention, and similar reference numerals will be used to describe similar portions throughout the present specification. Further, when a detailed description is omitted, only a detailed description of portions that may be easily understood by those skilled in the art will be omitted.

Through the present specification and claims, unless explicitly described otherwise, "comprising" any components will be understood to imply the inclusion of other components rather than the exclusion of any other components.

Hereinafter, a 'subscriber terminal' is assumed to show one subscriber terminal. However, the exemplary embodiments of the present invention to be described below are not limited thereto and may also be applied to a case in which the 'subscriber terminal' is subscriber terminal groups including a plurality of subscriber terminals.

Figure 1:
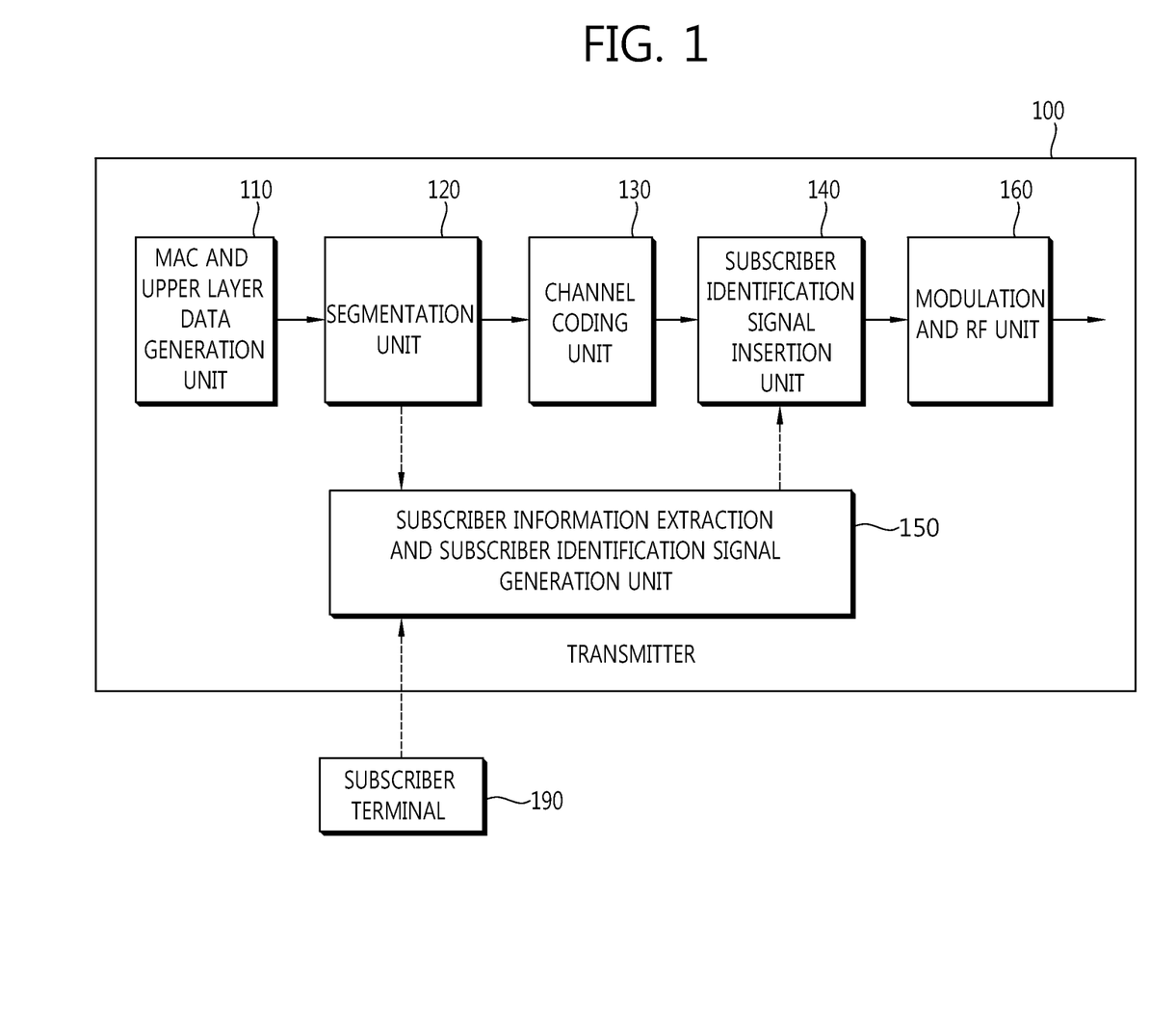
FIG. 1 is a block diagram showing a transmitter implementing a data transmitting method according to an exemplary embodiment of the present invention.

FIG. 1 shows an example of a block diagram of a transmitter implementing a data transmitting method according to an exemplary embodiment of the present invention.

Referring to FIG. 1, a transmitter 100 includes a media access control (MAC) and upper layer data generation unit 110, a segmentation unit 120, a channel coding unit 130, a subscriber identification signal insertion unit 140, a subscriber information extraction and subscriber identification signal generation unit 150, and a modulation and radio frequency (RF) unit 160. In FIG. 1, the segmentation unit 120, the channel coding unit 130, the subscriber identification signal insertion unit 140, and the modulation and RF unit 160 are operated in a physical layer.

The MAC and upper layer data generation unit 110 generates data for the MAC layer and upper layer that is located above the physical layer, wherein the data includes multiplexed data for a plurality of subscriber terminals.

The segmentation unit 120 is connected with the MAC and upper layer data generation unit 110 and the subscriber information extraction and subscriber identification signal generation unit 150. The segmentation unit 120 divides data received from the MAC and upper layer data generation unit 110 into a plurality of segment data. Each segment data may include data for a single subscriber terminal or data for a plurality of subscriber terminals. Generally, the number of subscriber terminals included in each segment data may be much smaller than the number of subscriber terminals included in data received from the MAC and upper layer data generation unit 110.

The channel coding unit 130 is connected with the segmentation unit 120 and performs the channel coding on each segment data output from the segmentation unit 120. Upon performing the channel coding, each segment data may perform the channel coding by being divided into a smaller unit. Further, the channel coding unit 130 includes an interleaver to perform interleaving. However, the channel coding unit 130 is not limited thereto, but may include components performing various functions according to the system so as to efficiently perform the channel coding in addition to the interleaver. Alternatively, the channel coding unit 130 may be replaced with other components for processing each segment data.

The subscriber identification signal insertion unit 140 is connected with the channel coding unit 130 and the subscriber information extraction and subscriber identification signal generation unit 150. The subscriber identification signal insertion unit 140 adds headers to head portions of each channel-coded segment data by using the subscriber identification signals received from the subscriber information extraction and subscriber identification signal generation unit 150.

The subscriber information extraction and subscriber identification signal generation unit 150 is connected with the segmentation unit 120, the subscriber identification signal insertion unit 140, and the subscriber terminal 190. The subscriber information extraction and subscriber identification signal generation unit 150 acquires information on an uplink channel from a subscriber terminal 190 and acquires information capable of identifying the subscriber terminal such as an MAC address or an IP address of the subscriber terminal based on the information. The subscriber information extraction and subscriber identification signal generation unit 150 extracts the subscriber information on at least one subscriber terminal included in each segment data generated from the segmentation unit 120 to generate the subscriber identification signals for the corresponding segment data. The subscriber information extraction and subscriber identification signal generation unit 150 transmits the subscriber identification signals generated as described above to the subscriber identification signal insertion unit 140.

The modulation and RF unit 160 is connected with the subscriber identification signal insertion unit 140 and modulates the signal received from the subscriber identification signal insertion unit 140 and transforms the modulated signal into the RF signal, which is in turn transmitted to each subscriber terminal through the cable.

Figure 2:
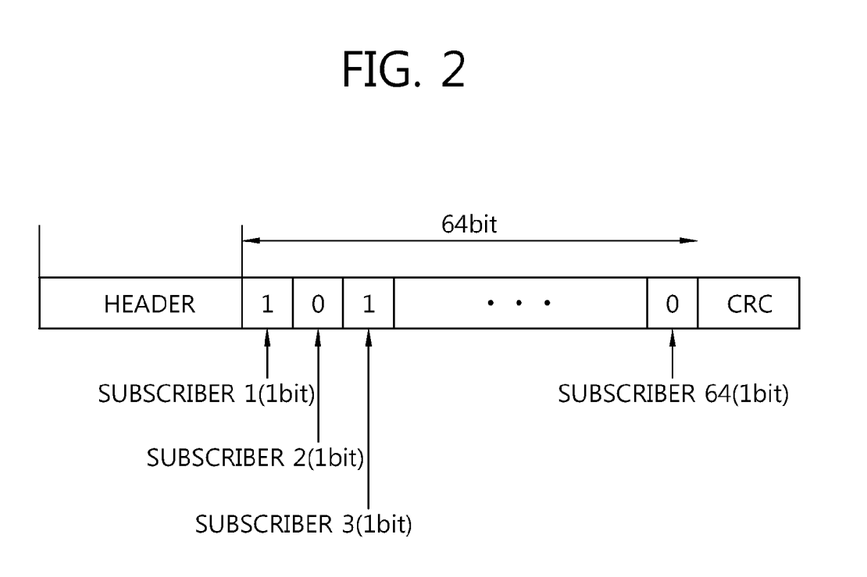
FIG. 2 is a diagram showing an example of subscriber identification signals generated by the data transmitting method according to the exemplary embodiment of the present invention.

FIG. 2 is a diagram showing an example of the subscriber identification signals generated by the data transmitting method according to the exemplary embodiment of the present invention.

It is assumed that one cell and 64 subscriber terminals share cable bidirectional multimedia services within the cable network. The subscriber identification signal includes a header, identification bits of each subscriber terminal, and a cyclic redundancy check (CRC). The identification bits of each subscriber terminal are assumed to be 1 bit and therefore, a total number of identification bits of the subscriber terminals become 64 bits. When the data of the corresponding subscriber terminal are included in the segment data, the identification bit of the corresponding subscriber terminal is set to be 1 and when the data of the corresponding subscriber terminal is not included in the segment data, the identification bit of the corresponding subscriber terminal is set to be 0. Referring to FIG. 2, the identification bit of subscriber terminal 1 and the identification bit of subscriber terminal 3 are set to be 1. That is, FIG. 2 shows a case in which data to be transmitted to terminals 1 and 3 are included in the corresponding segment data. The subscriber identification signals generated as described above are transmitted to the subscriber identification signal insertion unit 140 and are added to the head portions of the channel-coded segment data.

In the exemplary embodiment of the present invention, it is assumed that the length of the identification bits of each subscriber terminal is 1 bit, which is only an example. Therefore, the length of the identification bits of each subscriber terminal may be variously changed. Meanwhile, when a large number of subscriber terminals are present within a cell, the length of the subscriber identification signals are very long even though the length of the identification bits of each subscriber terminal is 1 bit. Therefore, at least one subscriber terminal group including the plurality of subscriber terminals may be set within the cell and the identification bits for the corresponding subscriber terminal group may be assigned. For example, when the number of subscriber terminals is 64 within the cell, 64 subscriber terminals may be grouped into 8 subscriber terminal groups. Each of the 8 subscriber terminals may be assigned with the identification bit of 1 bit. The total number of bits of the identification bits becomes 8 bits and therefore, the size of the subscriber identification signal may be reduced. The subscriber group may be set by various methods.

The header of the subscriber identification signal may include a synchronization code that may be used to distinguish the segment data. In addition, in order to increase robustness against noise, modulation of a relatively lower order such as quadrature phase shift keying (QPSK), or the like, is performed. The CRC is to check transfer errors of the subscriber identification signals. Alternatively, the subscriber identification signal may include a parity sequence of a simple error correction coder, instead of the CRC.

Meanwhile, the subscriber identification signals are added to the head portions of the segment data and thus, the transmission efficiency may be reduced. However, the length of the segment data is sufficiently longer than the length of the subscriber identification signals and thus, the reduction in transmission efficiency is not large, which can be disregarded. Further, the cell within the recent cable network include the smaller number of subscriber terminals than before, so as to increase the transmission rate and the transmission efficiency per the subscriber terminal. Recently, the number of subscriber terminals per the cable network is approximately several households. Since the number of subscriber terminals simultaneously used within one cell generally is smaller than the above-mentioned number, it is hardly likely to lengthen the length of the subscriber identification signals. Therefore, the subscriber identification signals are added to the head portions of the segment data and thus, the generated transmission efficiency may be disregarded.

Figure 3:
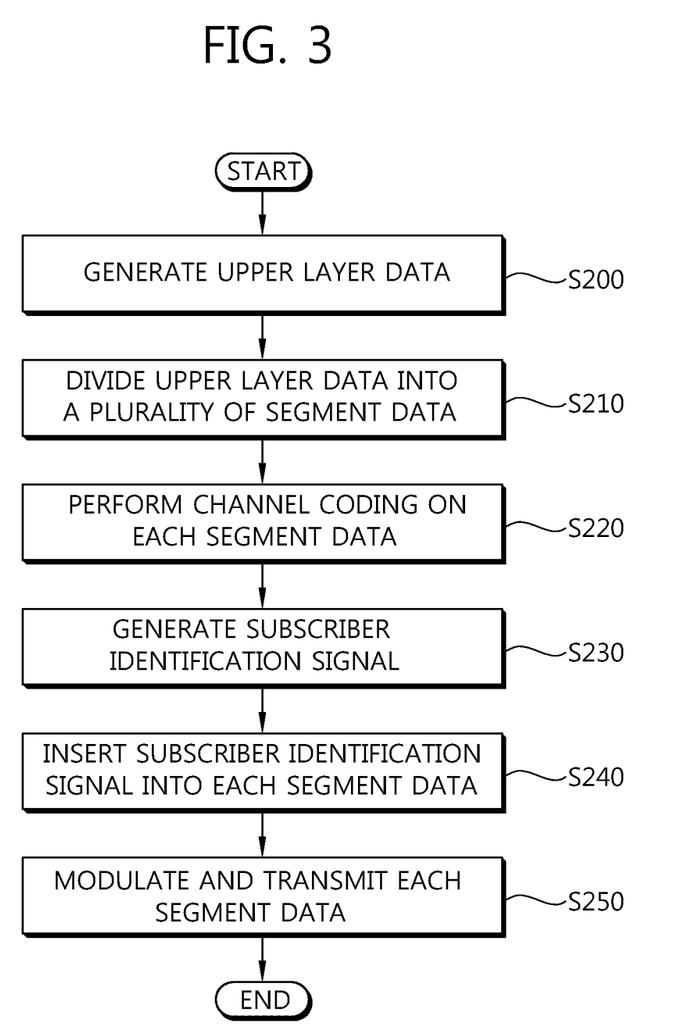
FIG. 3 is a diagram showing an example of the data transmitting method according to the exemplary embodiment of the present invention.

FIG. 3 is a diagram showing the data transmitting method according to the exemplary embodiment of the present invention.

Referring to FIG. 3, at S200, the transmitter generates the upper layer data including data of the plurality of multiplexed subscriber terminals. At S210, the transmitter divides the upper layer data into the plurality of segment data. At S220, the transmitter performs the channel coding on each segment data. At S230, the transmitter extracts the information on at least one subscriber terminal included in each segment data to generate the subscriber identification signal. At S240, the transmitter inserts the subscriber identification signal into each channel-coded segment data. At S250, the transmitter modulates and transmits each segment data into which the subscriber identification signals are inserted.

Figure 4:
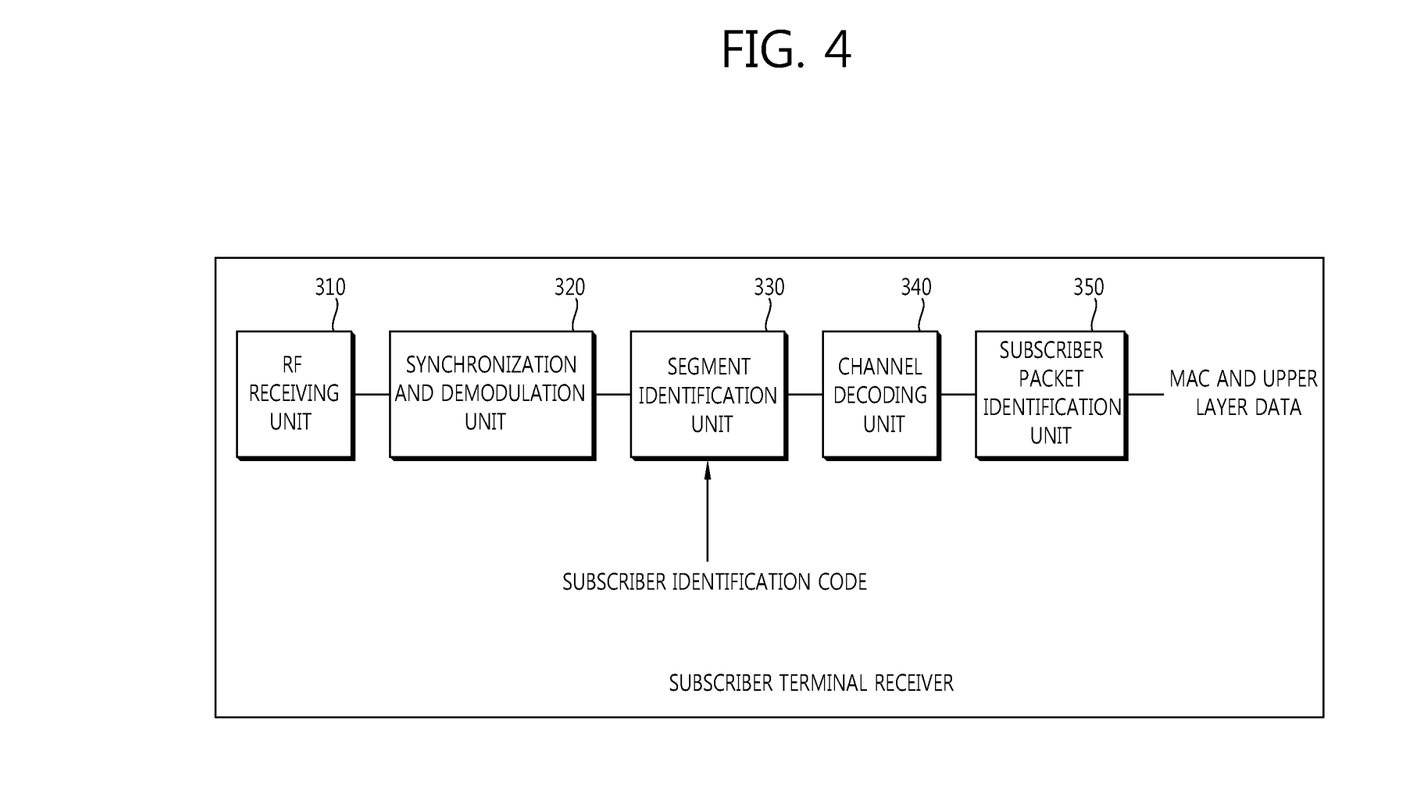
FIG. 4 is a block diagram showing a receiver of the subscriber terminal implementing the data transmitting method according to the exemplary embodiment of the present invention.

FIG. 4 is a block diagram showing a subscriber terminal receiver implementing the data transmitting method according to the exemplary embodiment of the present invention.

Referring to FIG. 4, the subscriber terminal receiver 300 includes an RF receiving unit 310, a synchronization and demodulation unit 320, a segment identification unit 330, a channel decoding unit 340, and a subscriber packet identification unit 350.

The RF receiving unit 310 receives the segment data from the transmitter and falls to a baseband by tuning a frequency channel that the subscriber wants. The synchronization and demodulation unit 320 is connected with the RF receiving unit 310 to acquire timing synchronization, frequency offset synchronization, or the like, thereby performing the system synchronization and demodulating the modulated signals by methods, such as 1024 quadrature amplitude modulation (QAM), or the like. In this case, the subscriber identification signals inserted into each segment signal may also be demodulated.

The segment identification unit 330 is connected with the synchronization and demodulation unit 320 to extract the segment data in which the data of the corresponding subscriber terminal are present, based on the demodulated subscriber identification signals and the subscriber identification codes acquired during the system initialization process. The subscriber identification codes, which are codes assigned to the subscriber terminal during the initialization process of the system, are codes simultaneously known by the transmitter and the subscriber terminal. The subscriber identification codes indicate a position to which the identification bits of each subscriber terminal are assigned within the subscriber identification signals. For example, subscriber 3 may be assigned with the identification bits of a third subscriber bit in the subscriber identification signals of FIG. 2. The segment identification unit 330 performs the CRC inspection on the demodulated subscriber identification signals. As a result of the CRC inspection, when the errors occur, all the signals received from the synchronization and demodulation unit 320 are transmitted to the channel decoding unit 340. As a result of the CRC inspection, when the errors does not occur, the segment data including the data of the corresponding subscriber terminal are identified and are then transmitted to the channel decoding unit 340.

The channel decoding unit 340 is connected with the segment identification unit 330 and performs the channel decoding only when the segment data including the data of the corresponding subscriber terminal are present. Further, the channel decoding unit 340 includes a de-interleaver to perform may perform de-interleaving. However, the channel decoding unit 340 is not limited thereto, but may include components performing various functions according to the system so as to efficiently perform the channel decoding in addition to the de-interleaver. Alternatively, the channel decoding unit 340 may be replaced with other components for processing each segment data. The subscriber packet identification unit 350 is connected with the channel decoding unit 340 and extracts the data of the corresponding subscriber terminal from the segment data output from the channel decoding unit 340. In this case, various identification addresses, such as the IP address, the MAC address, or the like, of the corresponding subscriber terminal may be used.

Figure 5:
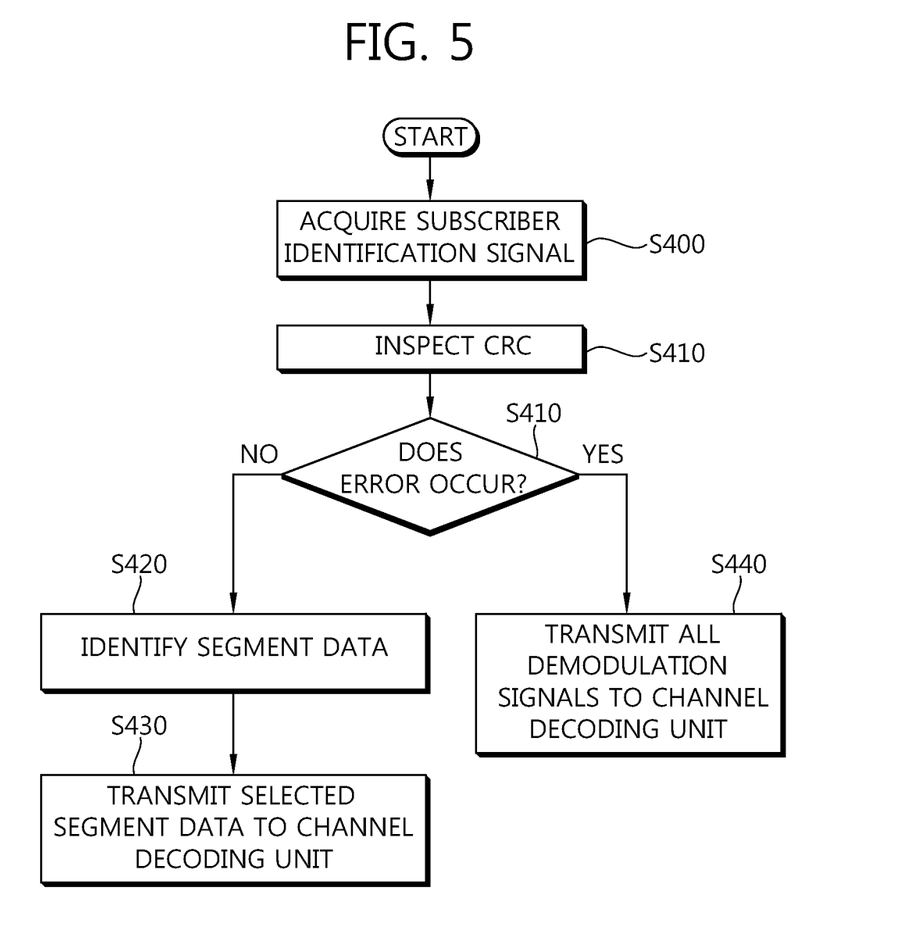
FIG. 5 is a block diagram showing an example of an operation of a segment identification unit of the receiver of the subscriber terminal implementing the data transmitting method according to the exemplary embodiment of the present invention.

FIG. 5 is a block diagram showing an example of an operation of a segment identification unit of the subscriber terminal receiver implementing the data transmitting method according to the exemplary embodiment of the present invention.

Referring to FIG. 5, at S410, the segment identification unit acquires the demodulated subscriber identification signals. At S410, the segment identification unit performs the CRC inspection on the demodulated subscriber identification signals. As a result of the CRC inspection, when the errors do not occur, the segment identification unit identifies the segment data including the data of the corresponding subscriber terminal at S420 and transmits the segment data selected at S430 to the channel decoding unit. As a result of the CRC inspection, when the errors occur, the segment identification unit transmits all the signals to the channel decoding unit at S440.

The exemplary embodiment of the present invention provides a method for identifying the data of the subscriber terminal before the physical layer by using the subscriber identification signals. The power loss of the subscriber terminal may be reduced by performing the decoding on only the data of the identified subscriber terminal. That is, there is no need to perform the decoding on all the received data according to the exemplary embodiment of the present invention. As the error correction method, low density parity check (LDPC), turbo coding, BCH coding, Reed-Solomon coding, or the like, may be used, which are a factor of maximally increasing the complexity of the receiver. There is no need to perform the decoding on all the received data, such that the power loss of the subscriber terminal can be greatly reduced according to the exemplary embodiment of the present invention.

The exemplary embodiments of the present invention may be implemented by hardware, software, or a combination thereof. The hardware may be implemented by an application specific integrated circuit (ASIC), digital signal processing (DSP), a programmable logic device (PLD), a field programmable gate array (FPGA), a processor, a controller, a microprocessor, other electronic units, or a combination thereof, all of which are designed so as to perform the above-mentioned functions. The software may be implemented by a module performing the above-mentioned functions. The software may be stored in a memory unit and may be executed by a processor. The memory unit or a processor may adopt various units well-known to those skilled in the art.

The exemplary embodiments of the present invention can reduce the power consumption of the subscriber terminal.

In the above-mentioned exemplary system, although the methods have described based on a flow chart as a series of steps or blocks, the present invention is not limited to a sequence of steps but any step may be generated in a different sequence or simultaneously from or with other steps as described above. Further, it may be appreciated by those skilled in the art that steps shown in a flow chart is non-exclusive and therefore, include other steps or deletes one or more steps of a flow chart without having an effect on the scope of the present invention.

The above-mentioned embodiments include examples of various aspects. Although all possible combinations showing various aspects are not described, it may be appreciated by those skilled in the art that other combinations may be made. Therefore, the present invention should be construed as including all other substitutions, alterations and modifications belong to the following claims.

What is claimed is:

1. A transmitter in a cable network, the transmitter comprising:
    a media access control (MAC) and upper layer data generation unit configured to generate upper layer data including multiplexed data of a plurality of subscriber terminals;
    a segmentation unit, coupled to the MAC and upper layer data generation unit, and configured to divide the upper layer data into a plurality of segment data;
    a channel coding unit, coupled to the segmentation unit, and configured to perform channel coding on each segment data;
    a subscriber information extraction and subscriber identification signal generation unit, coupled to the segmentation unit, and configured to extract information on at least one subscriber terminal included in each segment data to generate subscriber identification signals;
    a subscriber identification signal insertion unit, coupled to the channel coding unit and the subscriber information extraction and subscriber identification signal generation unit, and configured to insert the subscriber identification signals into each channel-coded segment data; and
    a modulation and radio frequency (RF) unit, coupled to the subscriber identification signal insertion unit, and configured to modulate and transmit each segment data into which the subscriber identification signals are inserted.

2. The transmitter of claim 1, wherein the channel coding unit is further configured to perform interleaving on each segment data.

3. The transmitter of claim 1, wherein the subscriber information extraction and subscriber identification signal generation unit is further configured to acquire information identifying subscriber terminal based on information on an uplink channel obtained from the subscriber terminal.

4. The transmitter of claim 3, wherein the information identifying the subscriber terminal is a MAC address or an IP address of the subscriber terminal.

5. The transmitter of claim 1, wherein the subscriber identification signal includes a header, an identification bit of each subscriber terminal and a cyclic redundancy check (CRC).

6. The transmitter of claim 5, wherein the identification bit of each subscriber terminal is 1 bit.

7. The transmitter of claim 5, wherein the identification bit of each subscriber terminal is set to be 1 when the data of the corresponding subscriber terminal are included in each segment data, and the identification bit of each subscriber terminal is set to be 0 when the data of the corresponding subscriber terminal are not included in each segment.

8. The transmitter of claim 5, wherein a total number of bits of the identification bit of each subscriber terminal is the same as the number of subscriber terminals within a cell.

9. The transmitter of claim 5, wherein the header includes a synchronization code.

10. The transmitter of claim 5, wherein the header is subjected to quadrature phase shift keying (QPSK) modulation.

11. The transmitter of claim 1, wherein the segmentation unit, the channel coding unit, the subscriber identification signal insertion unit, and the modulation and RF unit are operated in a physical layer.

12. A method for transmitting data in a cable network, the method comprising:

generating, with a media access control (MAC) and upper layer data generation unit, upper layer data including multiplexed data of a plurality of subscriber terminals;

dividing, with a segmentation unit that is coupled to the MAC and upper layer data generation unit, the upper layer data into a plurality of segment data;

performing, with a channel coding unit that is coupled to the segmentation unit, channel coding on each segment data;

extracting, with a subscriber information extraction and subscriber identification signal generation unit that is coupled to the segmentation unit, information on at least one subscriber terminal included in each segment data to generate subscriber identification signals;

inserting, with a subscriber identification signal insertion unit that is coupled to the channel coding unit and the subscriber information extraction and subscriber identification signal generation unit, the subscriber identification signals in each channel-coded segment data; and modulating and transmitting, with a modulation and radio frequency (RF) unit that is coupled to the subscriber identification signal insertion unit, each segment data into which the subscriber identification signals are inserted.

13. A subscriber terminal in a cable network, the subscriber terminal comprising:

a radio frequency (RF) receiving unit configured to receive a plurality of segment data including subscriber identification signals;

a synchronization and demodulation unit, coupled to the RF receiving unit, and configured to acquire system synchronization and demodulate the plurality of segment data;

a segment identification unit, coupled to the synchronization and demodulation unit, and configured to extract segment data in which data of the subscriber terminal are present among the plurality of segment data based on the demodulated subscriber identification signals and a subscriber identification code;

a channel decoding unit, coupled to the segment identification unit, and configured to perform channel decoding on the segment data in which the data of the subscriber terminal are present; and a subscriber packet identification unit, coupled to the channel decoding unit, and configured to extract the data of the subscriber terminal in the segment data in which the data of the subscriber terminal are present.

14. The subscriber terminal of claim 13, wherein the subscriber identification code is acquired during a system initialization process.

15. The subscriber terminal of claim 13, wherein the subscriber identification code indicates a position to which an identification bit of each subscriber terminal are assigned within the subscriber identification signals.

16. The subscriber terminal of claim 13, wherein the segment identification unit is further configured to inspect a cyclic redundancy check of the demodulated subscriber identification signals.

17. The subscriber terminal of claim 16, wherein the segment identification unit is further configured to transport all the plurality of segment data to the channel decoding unit when errors occur as a result of the CRC inspection.

18. The subscriber terminal of claim 16, wherein the segment identification unit is further configured to transport the segment data in which the data of the subscriber terminal are present to the channel decoding unit when errors do not occur as a result of the CRC inspection.

19. The subscriber terminal of claim 16, wherein the channel decoding unit is further configured to perform de-interleaving on the segment data in which the data of the subscriber terminal are present.

* * * * *